(12) United States Patent
Miller et al.

(10) Patent No.: US 7,058,530 B1
(45) Date of Patent: Jun. 6, 2006

(54) COMPARATIVE SPECTRUM TRACE METHOD AND APPARATUS FOR DETECTING TRANSMITTERS

(75) Inventors: Michael Miller, Cookeville, TN (US); Bruce R. Barsumian, Cookeville, TN (US); Thomas H. Jones, Cookeville, TN (US)

(73) Assignee: Research Electronics International, LLC, Algood, TN (US)

( * ) Notice: Subject to any disclaimer, the term of this patent is extended or adjusted under 35 U.S.C. 154(b) by 2 days.

(21) Appl. No.: 10/917,971

(22) Filed: Aug. 13, 2004

(51) Int. Cl.
*G06F 7/02* (2006.01)
(52) U.S. Cl. .......................... 702/76; 702/66; 702/67; 702/70
(58) Field of Classification Search ................ 702/66, 702/67, 70, 71, 176, 177, 179, 76; 324/627, 324/642; 703/13; 705/1
See application file for complete search history.

(56) References Cited

U.S. PATENT DOCUMENTS

| | | | | |
|---|---|---|---|---|
| 4,118,666 A | 10/1978 | Bernstein | ..................... | 374/77 |
| 4,346,480 A | 8/1982 | Poston | ........................ | 455/154 |
| 4,368,539 A | 1/1983 | Whidden | ..................... | 455/166 |
| 6,130,907 A | 10/2000 | Chen | .......................... | 375/200 |
| 2001/0052779 A1* | 12/2001 | Okazaki | ..................... | 324/637 |
| 2002/0090650 A1* | 7/2002 | Empedocles et al. | ........ | 435/7.1 |
| 2002/0095304 A1* | 7/2002 | Khazei | ........................... | 705/1 |

OTHER PUBLICATIONS

ISA Website: "Scan Mode Screen," dated Jul. 26, 2002.
ISA Website: "ECR-3 Smart Scan," dated Jul. 26, 2002.

* cited by examiner

*Primary Examiner*—Marc S. Hoff
*Assistant Examiner*—Felix Suarez
(74) *Attorney, Agent, or Firm*—Waddey & Patterson; Jason L. Hornkohl

(57) ABSTRACT

An improved method and system for detecting covert surveillance devices uses frequency spectrum traces produced by a spectrum analyzer. The electromagnetic spectrum is scanned in a reference area to produce a reference frequency spectrum trace. The electromagnetic spectrum is then continuously scanned in a nearby target area to produce a peak hold frequency spectrum trace. The reference frequency spectrum trace is then subtracted from the peak hold spectrum trace to produce a comparative frequency spectrum trace. Peaks in the comparative frequency spectrum correspond to signals that are unique to either the reference area or the target area or transitory in nature. Statistical analysis is performed on subsequently obtained frequency traces to identify any changes in the frequency traces.

22 Claims, 4 Drawing Sheets

FIGS. 2(a-c)

COMPARATIVE SPECTRUM TRACE METHOD AND APPARATUS FOR DETECTING TRANSMITTERS

FIELD OF THE INVENTION

The present invention relates generally to the field of surveillance device detection. More particularly, the present invention is directed toward an improved method and apparatus for detecting the presence of transmitting devices such as concealed surveillance devices in a target area by comparing a current or peak hold frequency spectrum trace obtained from a first location with a peak hold frequency spectrum trace obtained from a second location.

BACKGROUND OF THE INVENTION

Spectrum analyzers that detect and log signals that have a constant carrier frequency are well known in the prior art. However, there are an increasing number of sophisticated transmitters that prior art spectrum analyzers will not automatically log in memory. This is particularly true with regard to modern, high tech surveillance devices. To be more specific, AM, FM, and sub-carrier modulated signals are easily logged automatically with a prior art spectrum analyzer, however, a burst transmitter, frequency hopper or spread spectrum transmitter will typically not be logged because there is no stable carrier frequency for the analyzer to lock onto. Furthermore, if a single sweep of the electromagnetic spectrum is performed, there is a good chance that an intermittently transmitting device will not be transmitting during the duration of the sweep. As a result, sophisticated modern surveillance devices use such an intermittent or frequency dispersed transmitter. Therefore, there is a need in the prior art for an improved method and apparatus for detecting the presence of covert surveillance devices that increases the probability that these types of transmitters will be detected.

SUMMARY OF THE INVENTION

A preferred embodiment of the present invention is directed toward a method of detecting a transmitting electronic device. In accordance with the method, an electromagnetic spectrum is scanned in a reference location with a spectrum analyzer to produce a reference spectrum and the reference spectrum is stored in a reference spectrum memory. In an alternative embodiment, the reference spectrum may be a peak hold spectrum that has been obtained during a reference analysis period. The electromagnetic spectrum is repeatedly scanned in a target location to produce a peak hold spectrum having a series of data points wherein each data point in the peak hold spectrum represents the maximum detected signal strength of an electromagnetic signal of a particular frequency detected during an analysis period. The peak hold spectrum is stored in a peak hold spectrum memory. Alternatively, the target location may be scanned with a first spectrum analyzer and the reference location scanned with a second spectrum analyzer and data from the first and the second spectrum analyzers consolidated for analysis. The stored reference spectrum is compared to the stored peak hold spectrum to locate any transitory electromagnetic signals present in the target location that may be unique to the target location during the analysis period. The reference spectrum is preferably compared to the stored peak hold spectrum by subtracting the stored reference spectrum from the stored peak hold spectrum to create a transitory spectrum. The transitory spectrum, the peak hold spectrum and the reference spectrum are preferably displayed on a single spectrum analyzer display. Preferably, the transitory spectrum is displayed such that it is inverted and raised with respect to the reference spectrum and the peak hold spectrum. This inverted spectrum provides a unique view to rapidly identify differences between the reference and target spectrum. A time stamp is produced for at least some changes in the peak hold spectrum that identifies a time the change was made. The electromagnetic spectrum may be repeatedly scanned in a second target location to produce a second peak hold spectrum and the reference spectrum and the first and second peak hold spectrums mathematically compared to identify signals unique to the reference location or the first and second target locations. A second peak hold spectrum may also be created in the target area during a second analysis period and the first and second peak hold spectrums mathematically compared to identify any signals unique to the first analysis period or the second analysis period.

Another embodiment of the present invention is directed toward a method of detecting the presence of limited duration target signals being transmitted from a location. In accordance with the method, an electromagnetic spectrum band in the location is scanned to produce a first frequency spectrum trace. The first frequency spectrum trace is stored in a memory. Alternatively, the electromagnetic spectrum band in the location may be repeatedly scanned to produce a plurality of frequency spectrum traces and a first frequency spectrum trace statistically calculated based upon at least one of the plurality of frequency spectrum traces. To provide for maximum sensitivity, the lowest amplitude detected for each frequency point in the plurality of frequency spectrum traces may be used to create a minimum reference trace for use as the first frequency spectrum trace. Such a minimum reference trace is particularly useful for detecting expected transitory transmissions such as cell phones. Alternately, other statistical functions may be employed on the plurality of traces to produce a first frequency trace that may be useful for different types of signal searches. For example, an average of the traces may be generated as a baseline to look for new signals or view modulation characteristics of certain types of transmitters. Or a standard deviation may be generated to investigate portions of the spectrum that have increased transitory activity. This concept should not be limited to the minimum, peak, average, or standard deviation as suggested here. Once a first frequency trace has been scanned or calculated, the electromagnetic spectrum band in the location is scanned to produce a second frequency spectrum trace. The second frequency spectrum trace is stored in the memory. Preferably, the scans of the electromagnetic spectrum are performed with a spectrum analyzer that is dedicated to the location. Statistical analysis is performed on the first frequency spectrum trace and the second frequency trace to determine an amount of deviation of the second frequency trace from the first frequency trace. Preferably, a deviation of each frequency point in the second frequency trace from each frequency point in the first frequency spectrum trace is calculated. The deviation of the second frequency spectrum trace from the first frequency spectrum trace is then examined to provide an indication of any intermittent transmissions in the location that may have occurred subsequent to the acquisition of the first spectrum trace. The process is repeated on a continuous basis such that multiple traces are obtained for use in the statistical analysis and such that continuous coverage is provided for the location. In addition, the electromagnetic spectrum may be scanned in a second location near to the location to produce a second location frequency spectrum trace. The second location reference frequency spectrum trace is then compared to the first or the second frequency spectrum trace to isolate any signals unique to the first location or the second location.

Yet another embodiment of the present invention is directed toward a method of detecting a transitory signal in an electromagnetic spectrum in a first location with a spectrum analyzer. In accordance with the method, the electromagnetic spectrum in the first location is scanned with the spectrum analyzer during a first time interval to produce a first frequency spectrum trace comprised of a series of data points wherein each data point represents the maximum detected signal strength for a particular frequency band of the electromagnetic spectrum during the first time interval. The series of data points of the first frequency spectrum trace are stored in a memory. The electromagnetic spectrum in the first location is then scanned with the spectrum analyzer during a second time interval to produce a second frequency spectrum trace comprised of a series of data points wherein each data point represents the maximum detected signal strength for a particular frequency band of the electromagnetic spectrum detected during the second time interval. The series of data points of the second frequency spectrum trace are stored in a memory. The stored data points of the first frequency spectrum trace are mathematically compared to the stored data points of the second frequency spectrum trace to identify signals that are unique to the first time interval or the second time interval. Preferably, the mathematical comparison of the first frequency spectrum trace to the second frequency spectrum trace is performed by subtracting the first frequency spectrum from the second frequency spectrum trace to produce a unique transmission frequency spectrum trace. The spectrum analyzer may then be repositioned in a second location and the electromagnetic spectrum scanned in the second location to produce a third frequency spectrum trace comprised of a series of data points wherein each data point represents a detected signal strength for a particular frequency band of the electromagnetic spectrum in the second location. The first, second and third frequency spectrum traces are then compared to identify signals unique to the first or second locations. In addition, a second spectrum analyzer may be used in the second location such that the first and the second spectrum analyzers communicate results of the individual scans with each other.

DETAILED DESCRIPTION OF THE INVENTION

Figure 1:
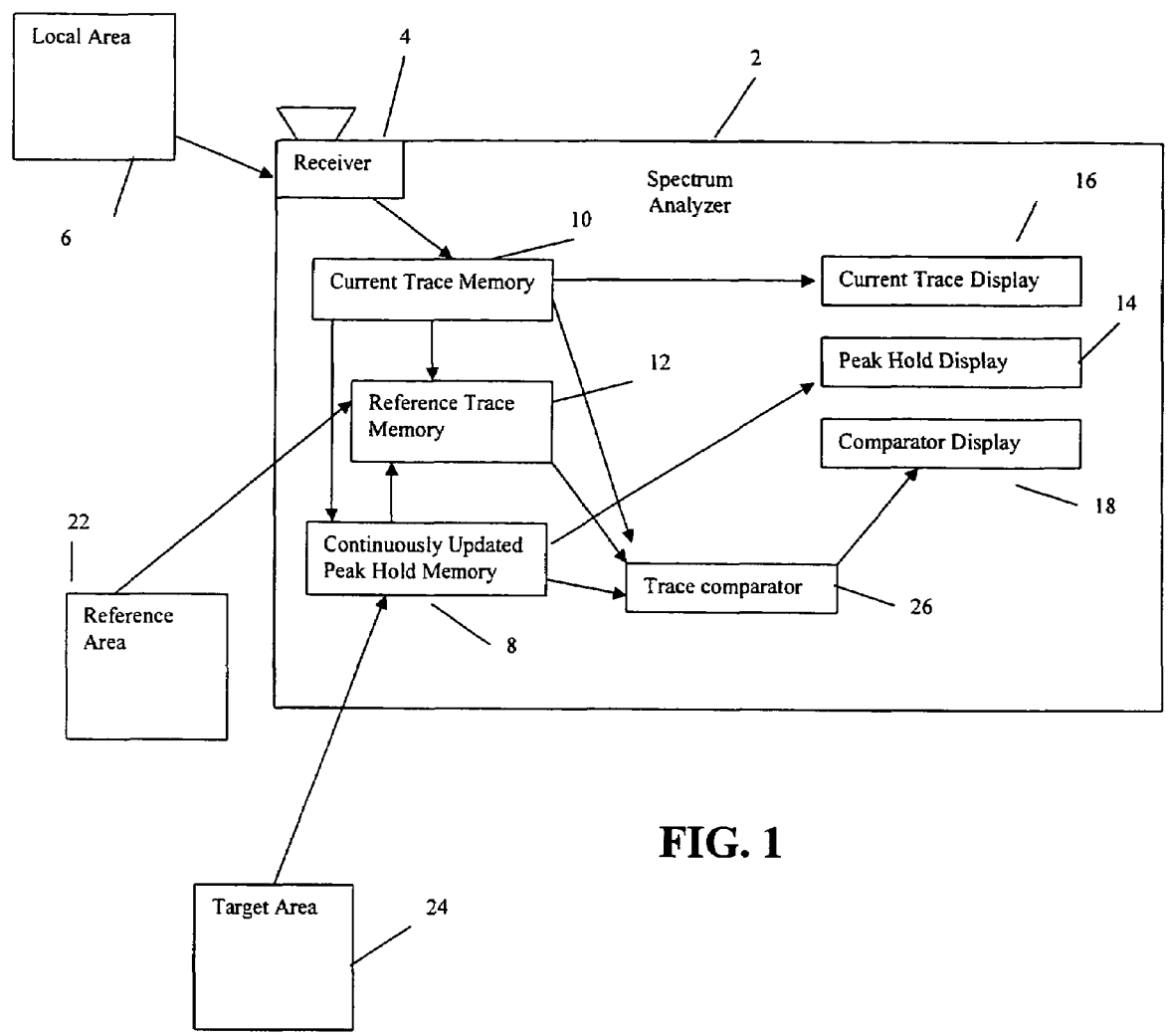
FIG. 1 is a functional diagram of a system for implementing a preferred embodiment of the present invention for detecting covert surveillance devices.

The preferred embodiments of the present invention rely primarily on improved display modes and functionality incorporated into a spectrum analyzer to provide an improved method and apparatus for reliably detecting covert surveillance devices positioned in a target area. A functional diagram of a system for implementing such a preferred embodiment of the present invention is shown in FIG. 1. The embodiment utilizes a spectrum analyzer 2 that has a receiver 4 for scanning or sweeping at least a portion of the electromagnetic spectrum in the surrounding vicinity. The receiver 4 scans the local environment 6 for electromagnetic signals at each of a progression of frequencies in a frequency band to produce a current or real-time frequency spectrum trace that contains the detected signal amplitude for each monitored frequency. The current frequency trace is stored in a current trace memory 10. A current trace display 16 is used to display the frequency spectrum trace that results from the current frequency sweep being performed by the spectrum analyzer 2. As discussed in more detail below, the current frequency trace may be a peak-hold frequency trace or a real-time frequency trace in alternative embodiments of the present invention.

A continuously updated peak hold memory buffer 8 is also provided to receive a series of data points from the receiver wherein each data point corresponds to the detected signal strength for a particular frequency band in the scanned portion of the electromagnetic spectrum. To obtain a peak hold spectrum trace, the memory buffer 8 is reset and a first scan is performed by the receiver 4. During the first scan, all of the received signal strength values are stored in the peak hold memory buffer 8. However, on any subsequent scans, only intercepted frequency signals that have amplitude values that are larger than any previously stored values for a particular frequency are stored in the peak hold memory buffer 8. Thus, the peak hold memory 8 differs from the current trace memory 10 in that it contains a stored representation of the maximum signal amplitude detected for a particular frequency during a period of time since the peak hold memory 8 was last reset. In a most preferred embodiment, a time stamp is recorded every time a new maximum amplitude signal is intercepted and recorded in the peak hold memory 8. The provision of a time stamp is beneficial in that it allows the transmission schedule of a burst transmitter to be predicted based upon past transmissions.

Once the spectrum analyzer 2 is activated, the peak hold memory 8 is continuously updated with each subsequent scan of the selected portion of the electromagnetic spectrum such that each data point in the peak hold memory buffer 8 represents a maximum signal strength received for a given frequency band since the peak hold memory buffer 8 was last reset. Therefore, if any energy is captured by the spectrum analyzer's receiver 4 from a short or intermittent transmission, such as would be produced by a burst or frequency hopping transmitter, the evidence of this event is stored as a peak value in the peak hold memory buffer 8. Preferably, once activated, the peak hold memory buffer 8 is being continuously updated regardless of what the user of the spectrum analyzer 2 is currently doing. This helps insure that as many intermittent transmissions as possible will be detected.

As stated above, a current trace memory 10 is used to store the results of the last electromagnetic spectrum scan performed in the local area 6 with the spectrum analyzer 2. Thus, the current trace memory 10 is updated every time the spectrum analyzer 2 scans a portion of the electromagnetic spectrum. A reference trace memory 12 is provided to store reference traces that have been previously obtained from either the peak hold memory 8 or the current trace memory 10 and subsequently stored for later reference. Frequency traces obtained from previous scans can be individually selected by a user of the spectrum analyzer 2 for inclusion in the reference trace memory 12.

The spectrum analyzer 2 preferably contains a comparator 26 that can be used to compare traces stored in one of the trace memories 8, 10 or 12. The comparator 26 has a variety of different compare modes that can be used to compare the stored traces. In one compare mode, the comparator 26 subtracts a first trace from a second trace to produce a composite trace. In such a mode, any signals unique to the first trace will appear as negative peaks in the composite trace and any signals unique to the second trace will appear as positive peaks in the composite trace. In an alternative compare mode, the comparator 26 will subtract the absolute value of the first trace from the second trace. In this mode, any signals that are unique to either the first trace or the second trace will appear as positive peaks in the composite trace. Thus, if the current trace spectrum is subtracted from the peak hold spectrum, all of the continuous wave signals present in both spectrums will be subtracted out such that the remaining comparative spectrum will only contain signals unique to one of the spectrums or due to intermittent transmitters that temporarily radiated but have since ceased to transmit. Once it has been established that an intermittent transmission is occurring, traditional counter surveillance methods can be used to determine the source of the transmission's location.

A peak hold trace display mode 14, a current trace display mode 16 and a comparative trace display mode 18 are preferably provided in the spectrum analyzer 2 to aid in the detection of covert transmitters. These display modes 14, 16 and 18 may be embodied in separate display screens or through the use of associated windows in a main display screen. The peak display mode 14 is based on the peak hold memory 8 and the current trace display mode 16 is based on the current trace memory 10. Similarly, the comparative trace display mode 18 is based on the comparative trace memory 12 and, thus, the trace displayed will depend upon the type of comparison performed. By configuring the comparative display mode 18 to display a peak hold minus current frequency trace, any evidence of sporadic transmissions will be displayed. If two peak hold spectrums from different locations are subtracted from one another, only signals that are unique to one of the locations will be displayed. Thus, the comparative frequency display mode 18 can be configured to display evidence of cell phones, pagers, two-way radios, or any other signals that are not continuously transmitting or only signals that are unique to a particular location.

The comparative frequency display mode 18 may also operate to display the traces in waterfall fashion. Such a waterfall display is produced by displaying a current trace on the display, incrementally shifting the displayed trace up or down on the display and then displaying a subsequently obtained trace below or above the previous trace. As additional traces are obtained, the display continues to scroll the results up or down the display screen in waterfall fashion such that changes in the displayed traces can be observed by an operator of the spectrum analyzer.

A variety of alternative analysis schemes can be utilized to detect covert surveillance devices with the spectrum analyzer 2 of FIG. 1. For example, a plurality of scans of the electromagnetic spectrum could be performed in the target area 24 over a period of time to produce a plurality of traces which are all stored in the reference memory 12. Statistical analysis could then be performed on the plurality of traces by the comparator 26 to determine quantities such as the standard deviation of the traces or an average or expected trace value. Traces that substantially deviate from the expected or average trace values are likely to contain unique signal information that may be indicative of a concealed transmitter. Thus, statistical analysis can be used to determine which of a plurality of scans is most likely to contain relevant or interesting signal information. Moreover, the statistical analysis can be performed on an ongoing basis such that each newly acquired sweep is automatically subjected to statistical analysis to determine whether or not it should be saved for later reference.

To scan a particular target area for the presence of intermittent transmissions with the spectrum analyzer 2 of FIG. 1, the spectrum analyzer 2 is preferably positioned in a first reference location 22 that is removed some distance from the target location 24. The distance should be large enough such that the amplitude of any electromagnetic radiation from a transmitting source located in the target location 24 will be greatly diminished in the reference location 22. However, the distance should be small enough that the background electromagnetic radiation from remote transmitters will be approximately the same for the reference 22 and target 24 locations. A spectrum trace, either a peak hold or current time spectrum trace, is produced for the reference location 22 by the spectrum analyzer 2 and stored in the appropriate associated memory. Generating the reference spectrum in a reference location 22 that is removed from, but close to, the target location 24 provides a number of benefits when attempting to detect the presence of concealed transmitting devices in either the target 24 and/or reference areas 22. Any signals created by continuous remote sources will be present in the frequency spectrum traces generated at both the reference 22 and target locations 24 and have approximately the same signal strengths. Thus, when the reference spectrum is subtracted from the peak hold spectrum, any signals due to continuous remote sources will be present in both spectrums and, thus, be removed by a subtraction process. However, if a transmitting surveillance device is present in the target area 24, the strength of the signal from the surveillance device will be much stronger in the target location 24 than the reference location 22. Thus, the subtraction process will not remove any signals that are unique to either the reference area 22 or the target area 24. Since covert surveillance devices typically have relatively low power transmitters, the detected strength of their transmissions is highly dependent upon the distance of the spectrum analyzer from the transmitter. Thus, comparing spectrum traces obtained from different, yet somewhat close, locations provides an excellent means for determining which signals detected in a particular area are originating from the area. Furthermore, by performing a peak hold scan over a period of time in the target area 24 any intermittent transmissions such as would be transmitted from a burst transmitter, spread spectrum transmitter or frequency hopping transmitter will be detected. The longer the period of time during which the peak hold spectrum is allowed to accumulate without resetting the peak hold memory, the more likely it is that an intermittent transmission will be detected. In addition, if peak hold spectrums are obtained from both the target area 24 and reference area 22 over period of time, periodic remote transmissions such as might occur on a frequency dedicated to cellular phones or pagers will be substantially removed by the subtraction process.

While two measurement locations 22 and 24 are shown in FIG. 1, it will be readily appreciated by those skilled in the art, in light of the present disclosure, that multiple spectrum traces could be obtained from multiple locations to further refine the process and increase the likelihood that a concealed covert surveillance device will be detected. In addition, scans of any area taken at one period of time may be compared to scans taken at the same location at a later date to determine if any new transmitting sources have been concealed in the area since the first scan was performed. Furthermore, multiple spectrum analyzers that communicate with one another can be used to eliminate the need to reposition the spectrum analyzers in different locations without departing from the present invention.

Figure 2A:
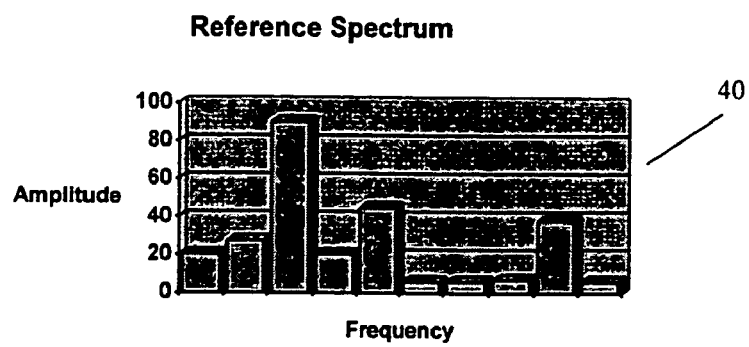
FIGS. 2(a)–(c) are exemplary frequency spectrum traces for a reference area, target area and comparative spectrum respectively utilized in accordance with a preferred embodiment of the present invention.
Figure 2B:
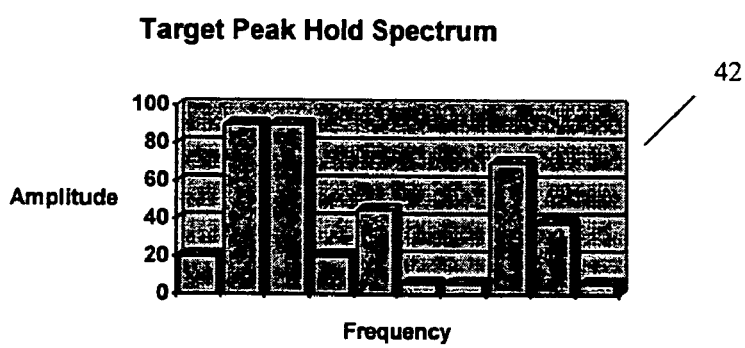
Figure 2C:
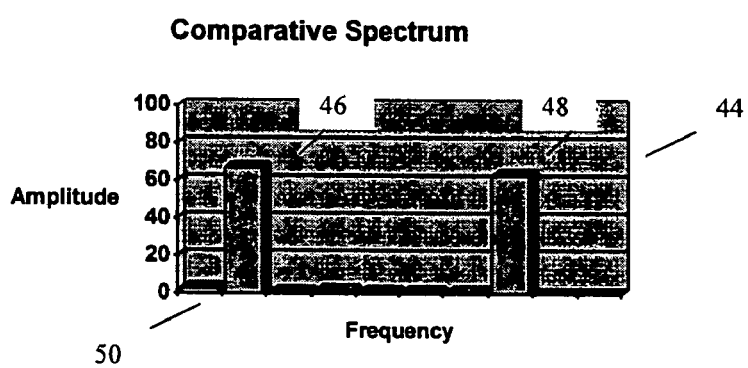

Referring now to FIGS. 2(a–c), an exemplary reference spectrum trace 40, peak hold spectrum trace 42, and difference spectrum trace 44 representing the difference between the peak hold spectrum 40 and the reference spectrum 42 are shown. In these particular spectrum traces 40, 42 and 44, there is a cellular phone transmission 46 at a first frequency, for example around 840 MHz, and a burst transmitter 48 at a second frequency, for example around 1.2 GHz. As can be seen in the difference spectrum trace 44, the burst transmitter 48 and the cellular phone signal 46 are by far the largest signals remaining in the difference spectrum 44. Thus, displaying the difference spectrum 44 readily facilitates the location of intermittent transmitters without the need to examine and classify each signal detected in either the reference spectrum 40 or peak hold spectrum 42. While a burst transmitter 48 will appear as a spike in the difference spectrum, a frequency hopper will appear as a series of spikes at different frequencies in the difference spectrum. Thus, the difference spectrum contains information that can be used to determine the type of intermittent transmitter detected. The small sections 50 at the lower edge of the difference spectrum 44 represent variations between the reference spectrum 40 and the peak hold spectrum 42 in the modulation of intercepted signals. The spectrums of FIG. 2(a–c) show an exemplary frequency band such as from 5 MHz to 1505 MHz. However, it will be readily appreciated by those skilled in the art that any desired frequency range can be swept with the spectrum analyzer. Furthermore, the spectrums 40, 42 and 44 shown are over simplified for exemplary purposes. An actual frequency spectrum will likely be much busier, particularly one that was obtained in a larger city or congested area. In such a case, a user would simply zoom into each interesting portion of the spectrum trace and individually analyze the areas and peaks as needed. In a preferred embodiment, the peak hold spectrum 42 will store frequency information at a constant resolution throughout the frequency band regardless of whether the display is zoomed in or not. Thus, when the display is zoomed in to view a signal, the peak hold spectrum 42 may appear to have coarse steps. However, since the resolution of the peak hold spectrum 42 is preferably fixed, any evidence of transmission will be maintained in the peak hold memory buffer regardless of how the display is manipulated.

Figure 3:
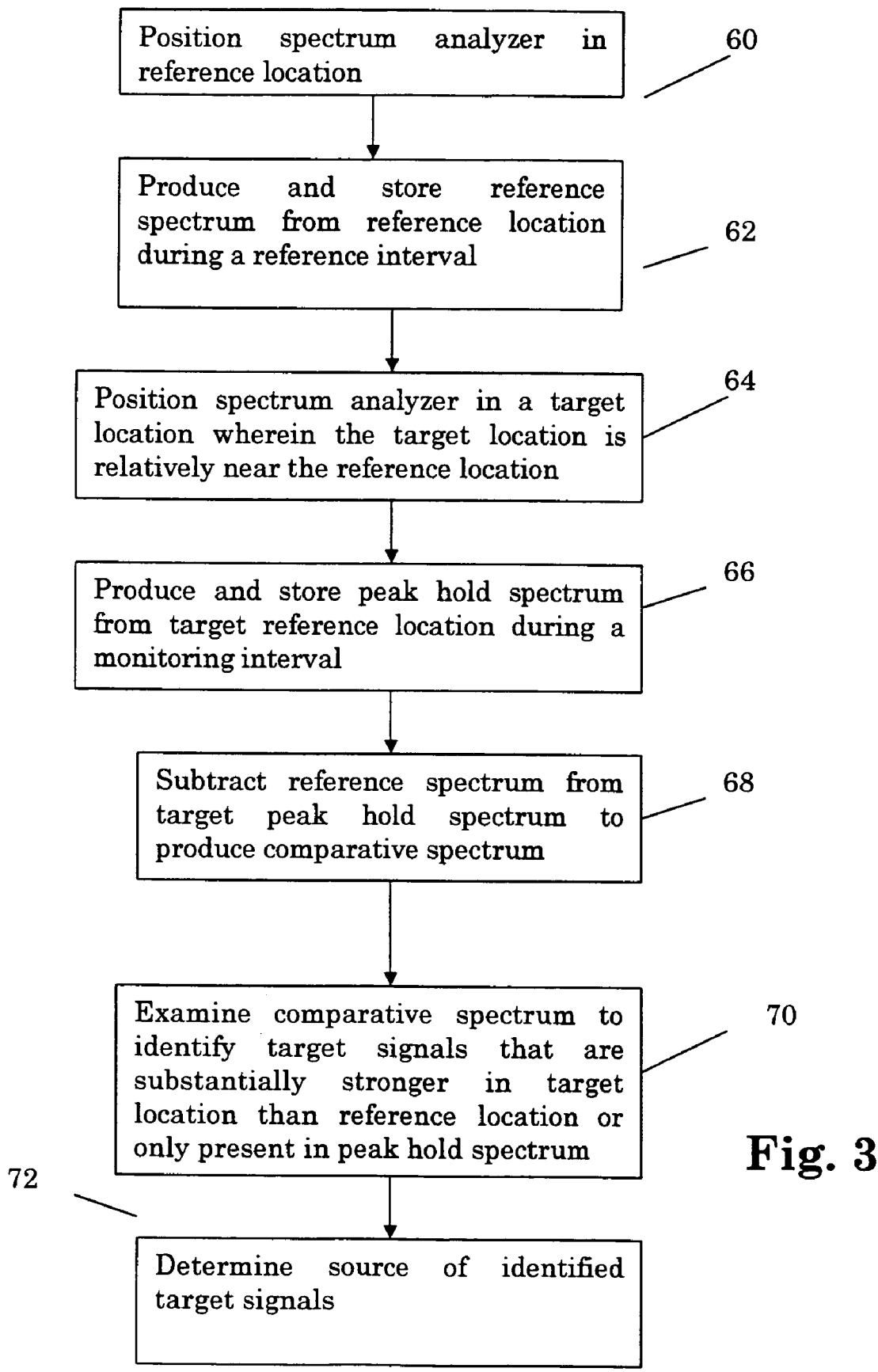
FIG. 3 is a flow chart of a preferred method for implementing an embodiment of the present invention.

Referring now to FIG. 3, a preferred method of detecting a concealed surveillance device in accordance with the present invention is shown. The method begins with the positioning of the spectrum analyzer in a reference location as shown in step 60. Once the spectrum analyzer is positioned in the reference location, a reference spectrum containing friendly or known source signals from the reference location is produced and stored in a memory in step 62. The reference spectrum can be either a peak hold type spectrum produced over an interval or a single scan spectrum as discussed herein above. Once the reference spectrum is stored, the method then proceeds to step 64 wherein the spectrum analyzer is positioned in a target location that is relatively near the reference location. Relatively near as used herein refers to a location that is close enough to have approximately the save level of remote background electromagnetic signals as the target area yet far enough away to appreciably attenuate any signals being transmitted form the target location. This distance is usually less than one half mile and, most preferably, just outside of the building wherein the target location or room is situated.

In step 66, a peak hold spectrum is created by the spectrum analyzer which has been positioned in the target area during a monitoring interval. The first step in creating the peak hold spectrum is to reset the peak hold memory buffer of the spectrum analyzer. The monitoring interval is preferably selected to be as long as possible since, the longer the electromagnetic spectrum is monitored in the area, the greater the chance that an intermittently transmitting device such as a burst transmitter will be detected. During this monitoring interval, the peak memory display buffer is continuously being updated regardless of whether or not the spectrum analyzer is being used to perform other automatic and manual functions. Thus, the analysis or monitoring interval should preferably be the entire time that the spectrum analyzer is positioned in the target location. Once the peak hold spectrum has been obtained from the target location, the reference spectrum is subtracted from the target peak hold spectrum to produce a comparative spectrum in step 68. In step 70, the comparative spectrum is examined to identify target signals that are substantially higher in amplitude in the target location than the reference location or only present in either the target or reference location. Once signals have been identified that are originating from the target location, the method proceeds to step 72 wherein the transmitting sources themselves are located in any of one of a variety of methods described in the prior art.

Figure 4:
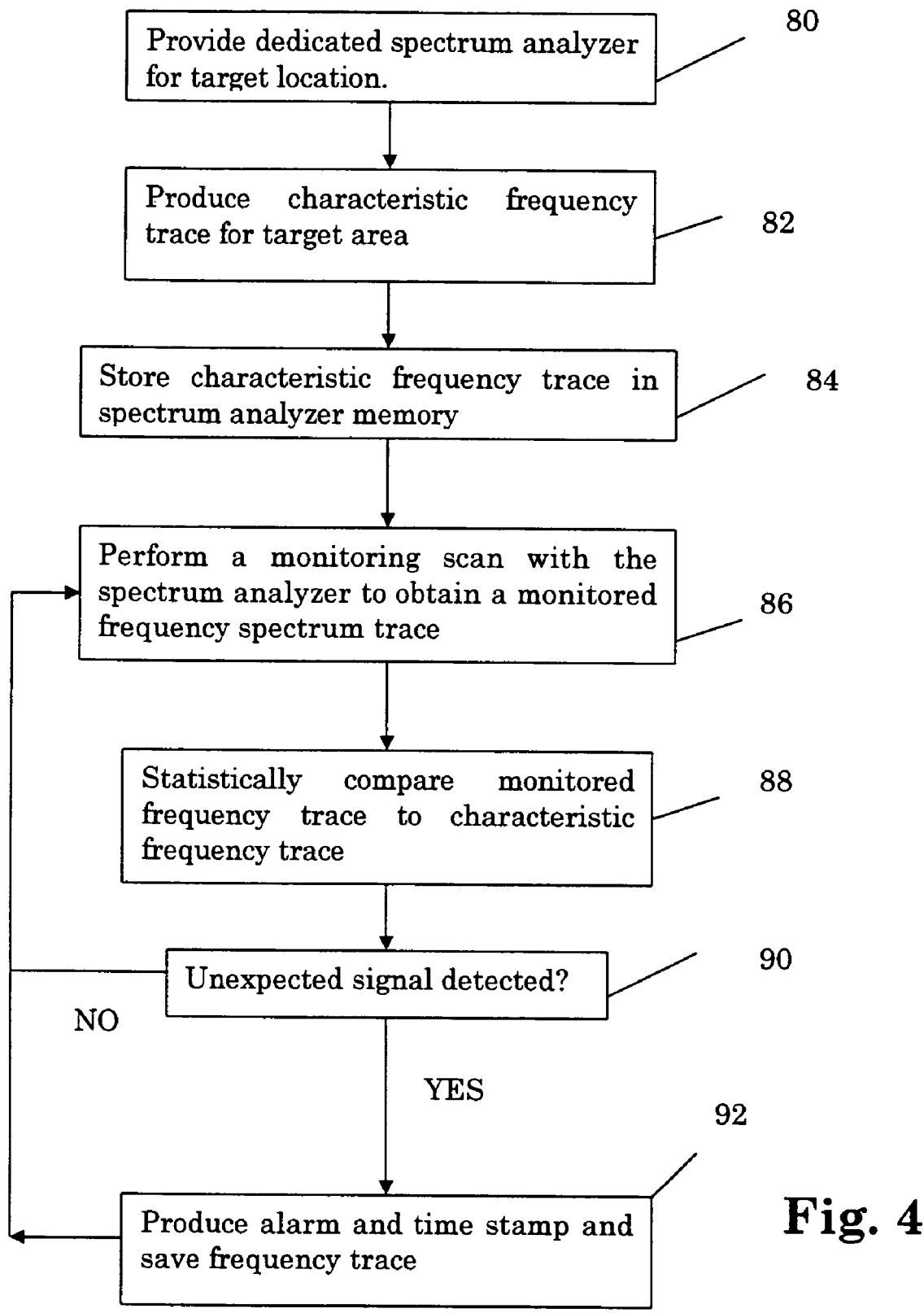
FIG. 4 is a flow chart of preferred method of monitoring a target area with a dedicated spectrum analyzer in accordance with an embodiment of the present invention.

A preferred method of monitoring a target location for the presence of any concealed intermittently transmitting devices with a dedicated or in place spectrum analyzer in accordance with an embodiment of the present invention is set forth in FIG. 4. As discussed in more detail below, the spectrum analyzer is preferably dedicated to monitoring the target area so that the spectrum analyzer can become familiar with the electromagnetic environment of the target area and, thus, detect any unusual transmissions that may occur. The method begins in step 80 with the provision of a dedicated spectrum analyzer for a target location. In step 82, at least one characteristic spectrum trace is obtained by the spectrum analyzer. The characteristic spectrum trace represents the frequency trace expected to be detected in the target area when no concealed transmitters are present. Thus, the characteristic trace is preferably obtained after a thorough search has been performed to insure that no such covert devices are already present. Alternatively, the characteristic trace may be determined by performing statistical and localized spectrum analysis on a number of frequency spectrum traces obtained from the target area over a period of time. For example, multiple frequency spectrum traces could be obtained over a period of time and examined to determine a standard deviation of each frequency point in the spectrum over a period of time. Frequencies dedicated to intermittent transmissions due to cell phones, pagers, etc. will have a predictable deviation when viewed over a period of time and can be individually examined or removed from consideration depending upon the security requirements of the user. If extra sensitivity is desired, the characteristic trace can be selected to correspond to the minimum detected amplitude for each frequency point in the previously obtained frequency traces for the target area. Such a minimum reference trace will effectively isolate signals such as cell phone and pager signals that are usually, but not always, present in the target environment. Thus, the characteristic frequency trace is selected to characterize the expected electromagnetic signals that will be detected in the target area. Regardless of how the characteristic frequency trace is calculated, once it has been obtained, the characteristic frequency trace is stored in a memory of the spectrum analyzer in step 84.

In step 86, a monitoring period is initiated by performing a monitoring scan with the spectrum analyzer to obtain a monitored frequency spectrum trace. The monitored frequency spectrum trace is then statistically compared to the stored characteristic frequency in step 88 to identify any unexpected signals present in the monitored frequency spectrum. As discussed in more detail above, this comparison can be performed in a variety of manners depending upon the desired sensitivity of the system and the type of transmission to be detected. For example, the spectrum analyzer can be programmed to ignore or detect regular cell phone handshaking signal transmissions depending upon the required level of security. In step 90, it is determined whether or not an unexpected signal was detected. If no unexpected signals are identified, the method returns to step 86 and wherein the spectrum analyzer performs another monitoring scan. If an unexpected signal is identified, the method proceeds to step 92 wherein an alarm is produced to alert a user of the system that a suspicious signal has been identified, a time stamp is produced for the suspicious scan and the scan is saved for later reference. A user can then use standard analysis techniques on the saved spectrum trace to determine the nature and location of the suspicious transmission. The method then returns to step 86 wherein the monitoring continues.

Although there have been described particular embodiments of the present invention of a new and useful Comparative Spectrum Trace Method and Apparatus for Detecting Transmitters, it is not intended that such references be construed as limitations upon the scope of this invention except as set forth in the following claims.

The invention claimed is:

1. A method of detecting a concealed transmitting electronic device, said method comprising:
scanning an electromagnetic spectrum in a reference location with a spectrum analyzer to produce a reference spectrum and storing said reference spectrum in a reference spectrum memory;
repeatedly scanning the electromagnetic spectrum in a target location to produce a peak hold spectrum having a series of data points wherein each data point in said peak hold spectrum represents a maximum detected signal strength of an electromagnetic signal of a particular frequency detected during an analysis period and storing said peak hold spectrum in a peak hold spectrum memory; and
comparing said stored reference spectrum to said stored peak hold spectrum to determine if a concealed transmitting electronic device is present in said target area.

2. The method of claim 1 wherein the step of comparing the reference spectrum to the stored peak hold spectrum further comprises subtracting the stored reference spectrum from the stored peak hold spectrum to create a transitory spectrum.

3. The method of claim 2 further comprising displaying said transitory spectrum, said peak hold spectrum and said reference spectrum on a single spectrum analyzer display such that said transitory spectrum is inverted with respect to said reference spectrum and said peak hold spectrum.

4. The method of claim 1 wherein said target location is scanned with a first spectrum analyzer and said reference location is scanned with a second spectrum analyzer and wherein data from said first and said second spectrum analyzers is consolidated for analysis.

5. The method of claim 1 wherein said reference spectrum is a peak hold spectrum that has been obtained during a reference analysis period.

6. The method of claim 1 further comprising producing a time stamp for at least some changes in the peak hold spectrum that identifies a time the change was made.

7. The method of claim 1 further comprising repeatedly scanning the electromagnetic spectrum in a second target location to produce a second peak hold spectrum and mathematically comparing said reference spectrum and said first and said second peak hold spectrums to identify signals unique to said reference location or said first and said second target locations.

8. The method of claim 1 further comprising creating a second peak hold spectrum in said target area during a second analysis period and mathematically comparing said first and second peak hold spectrums to identify any signals unique to said first analysis period or said second analysis period.

9. The method of claim 1 comprising displaying results of said comparison in a waterfall fashion.

10. A method of detecting the presence of limited duration target signals being transmitted from a concealed electronic device in a location, said method comprising:
scanning an electromagnetic spectrum band in said location to produce a first frequency spectrum trace;
storing said first frequency spectrum trace in a memory;
scanning said electromagnetic spectrum band in said location to produce a second frequency spectrum trace;
storing said second frequency spectrum trace in said memory; and
performing statistical analysis on said first frequency spectrum trace and said second frequency trace to analyze a difference between said second frequency trace from said first frequency trace; and
examining said difference of said second frequency spectrum trace from said first frequency spectrum trace to provide an indication of any intermittent transmissions in said location that are indicative of a concealed electronic device.

11. The method of claim 10 wherein scanning an electromagnetic spectrum band in said location to produce a first frequency spectrum trace further comprises repeatedly scanning said electromagnetic spectrum band to produce a plurality of frequency spectrum traces and statistically calculating a first frequency spectrum trace based upon at least one of said plurality of frequency spectrum traces.

12. The method of claim 11 further comprising performing said scans of said electromagnetic spectrum with a spectrum analyzer that is dedicated to said location.

13. The method of claim 10 further comprising generating statistical deviation information for particular frequencies in said electromagnetic spectrum band at particular times and using said statistical deviation information to aid in the detection of said limited duration signals.

14. The method of claim 10 wherein said step of performing statistical analysis further comprises calculating a standard deviation of said second frequency trace from said first frequency spectrum trace.

15. The method of claim 10 further comprising scanning said electromagnetic spectrum in a second location near to said location to produce a second location frequency spectrum trace and comparing said second location reference frequency spectrum trace to said first or said second frequency spectrum trace to isolate any signals unique to said location or said second location.

16. The method of claim 10 further comprising producing a time stamp that corresponds to a time each frequency spectrum trace is obtained.

17. The method of claim 10 further comprising displaying said difference of said second frequency spectrum trace from said first frequency spectrum trace in a waterfall fashion.

18. A method of detecting a transitory signal in an electromagnetic spectrum in a first location with a spectrum analyzer, said method comprising:
    scanning the electromagnetic spectrum in a first location with said spectrum analyzer during a first time interval to produce a first frequency spectrum trace comprised of a series of data points wherein each data point represents a maximum detected signal strength for a particular frequency band of the electromagnetic spectrum during said first time interval;
    storing said series of data points of said first frequency spectrum trace in a memory;
    scanning the electromagnetic spectrum in said first location with said spectrum analyzer during a second time interval to produce a second frequency spectrum trace comprised of a series of data points wherein each data point represents a maximum detected signal strength for a particular frequency band of the electromagnetic spectrum detected during said second time interval;
    storing said series of data points of said second frequency spectrum trace in a memory; and
    mathematically comparing said stored data points of said first frequency spectrum trace to said stored data points of said second frequency spectrum trace to identify signals that are unique to said first time interval or said second time interval.

19. The method of claim 18 wherein said step of mathematically comparing said first frequency spectrum trace to said second frequency spectrum trace further comprises subtracting said first frequency spectrum from said second frequency spectrum trace to produce a unique transmission frequency spectrum trace.

20. The method of claim 18 wherein each data point in said frequency spectrum traces has an associated time stamp that indicates a time a maximum signal strength represented by each data point occurred.

21. The method of claim 18 further comprising repositioning said spectrum analyzer in a second location and scanning the electromagnetic spectrum in the second location to produce a third frequency spectrum trace comprised of a series of data points wherein each data point represents a detected signal strength for a particular frequency band of the electromagnetic spectrum in said second location and comparing said first, second and third frequency spectrum traces to identify signals unique to said first or said second locations.

22. The method of claim 21 wherein a second spectrum analyzer is used in said second location and said first and said second spectrum analyzers communicate results of said scans with each other.

* * * * *